J. H. SIMPSON.
SIGNALING DEVICE.
APPLICATION FILED DEC. 11, 1912.
1,092,229.
Patented Apr. 7, 1914.
2 SHEETS—SHEET 1.
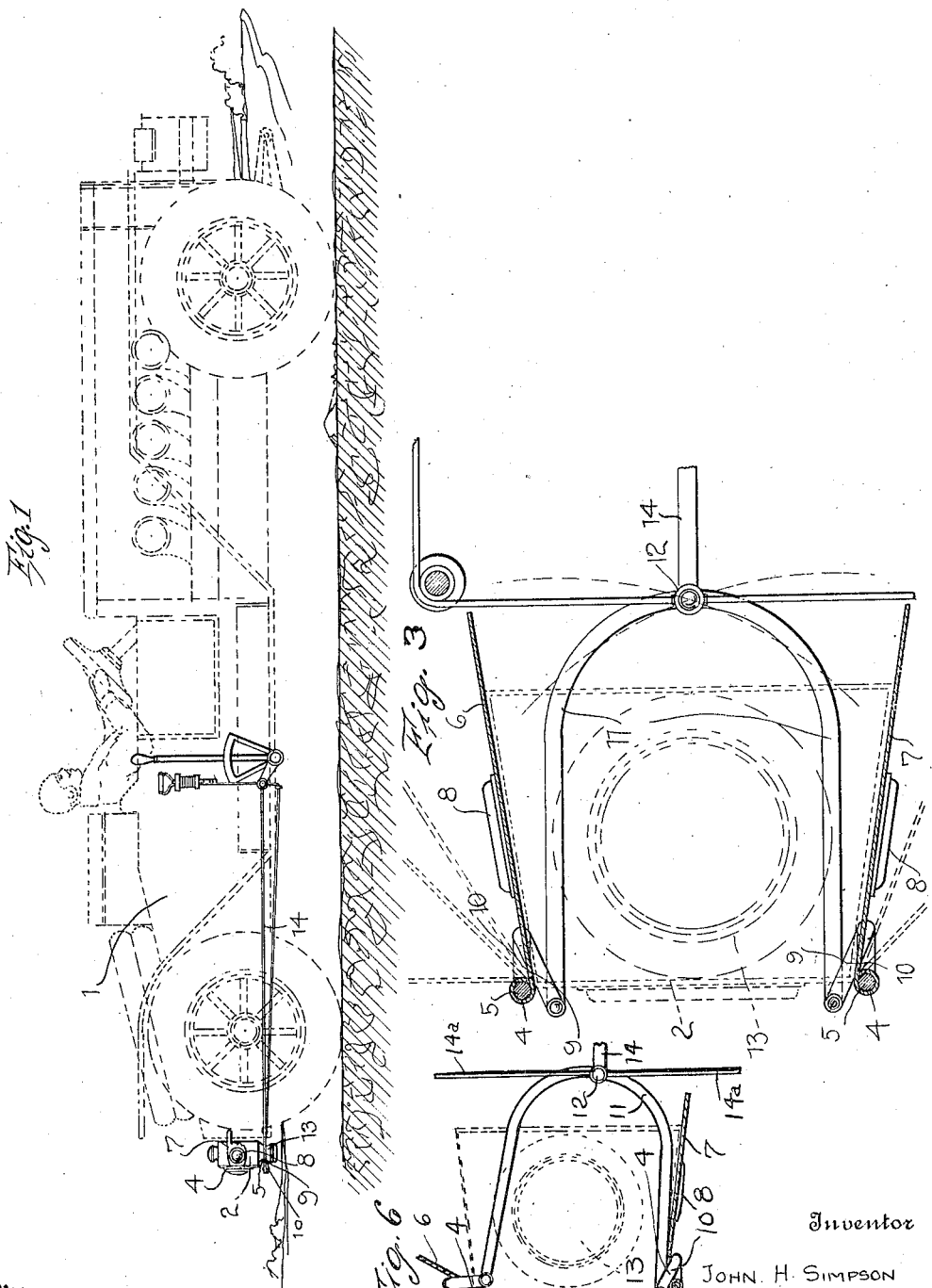
Witnesses
Robert M. Sutphen.
A. I. String
Inventor
John H. Simpson
By Watson E. Coleman
Attorney

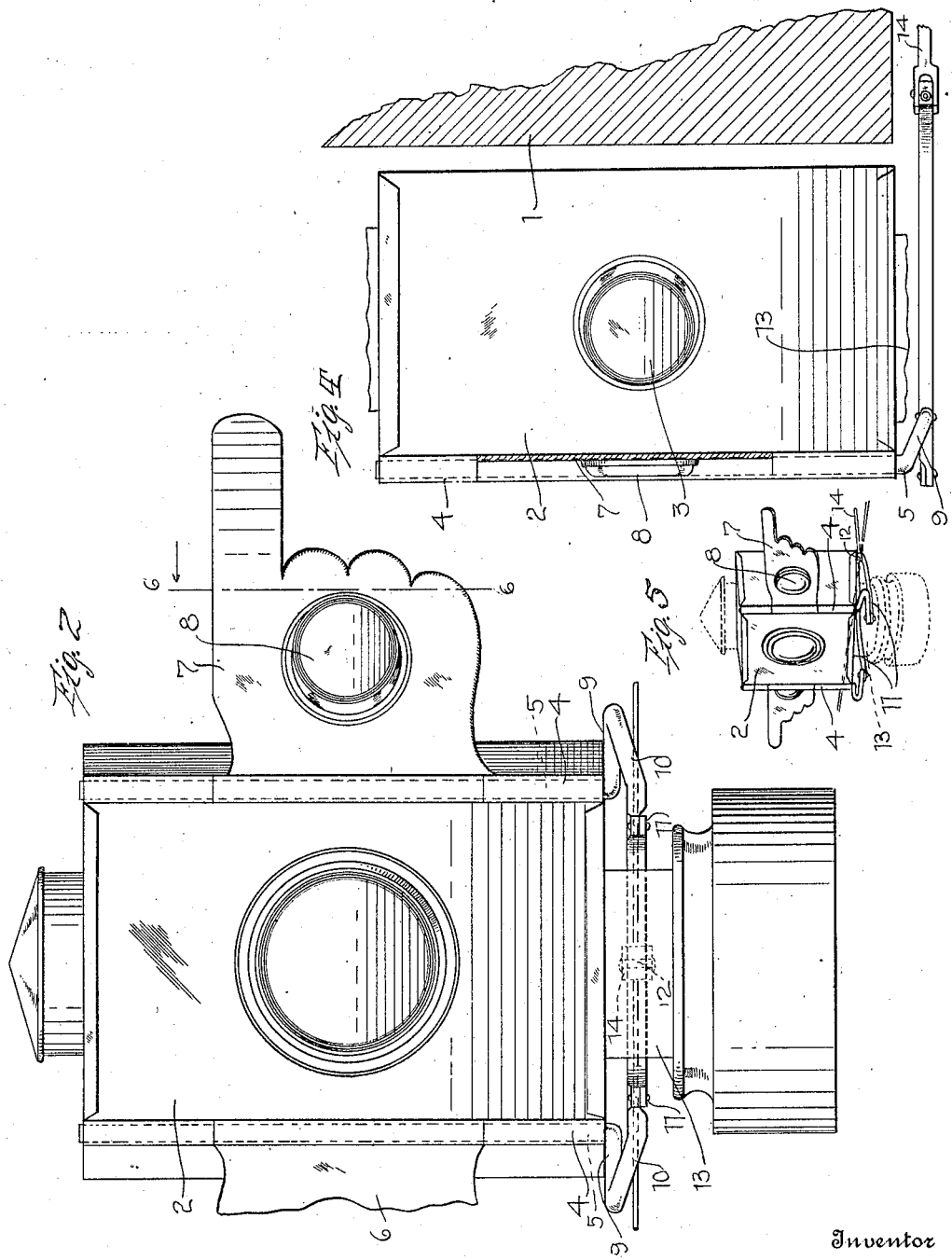

UNITED STATES PATENT OFFICE.

JOHN H. SIMPSON, OF PROVIDENCE, RHODE ISLAND.

SIGNALING DEVICE.

1,092,229.  Specification of Letters Patent.  Patented Apr. 7, 1914.

Application filed December 11, 1912. Serial No. 736,188.

*To all whom it may concern:*

Be it known that I, JOHN H. SIMPSON, a citizen of the United States, residing at Providence, in the county of Providence and State of Rhode Island, have invented certain new and useful Improvements in Signaling Devices, of which the following is a specification, reference being had to the accompanying drawings.

This invention relates to new and useful improvements in signaling devices and more particularly to a signaling device for automobiles and my object is to provide a device of this character which may be readily operated to indicate when a moving vehicle is about to turn to the right or left or when the same is to stop entirely.

A further object of the invention resides in providing an indicating means particularly adapted for use in connection with the tail lamp of an automobile and a still further object resides in providing signaling means which are adapted to fit over the side signals of the tail lamp.

A still further object of the invention resides in providing a device which is extremely simple and durable in construction, inexpensive to manufacture and one which will be very efficient and useful in operation.

With these and other objects in view, the invention consists in the novel features of construction, combination and arrangement of parts as will be hereinafter referred to and more particularly pointed out in the specification and claims.

In the accompanying drawings forming a part of this application, Figure 1 is a side elevation of an automobile showing my device applied to use thereon. Fig. 2 is a front elevation of a lamp showing the signal applied. Fig. 3 is a plan view of the signal and operating means with the lamp portion removed, partly in section and partly diagrammatic. Fig. 4 is a vertical section through the device as seen on line 6—6, Fig. 2; and Fig. 5 is a perspective view of the preferred form of the device. Fig. 6 is a plan view of the signaling and operating means with the lamp portion removed, partly in section and partly diagrammatic, disclosing one signal member in its extended position.

In describing my invention, I shall refer to the drawings in which similar reference characters designate corresponding parts throughout the several views and in which 1 indicates the body of a vehicle to which is applied the tail lamp 2 of the usual or any preferred type, the front face thereof being provided with the usual glass front and the side faces thereof being provided with the usual colored signaling glasses 3. Formed on the side edges of the front wall of the lamp 2, are the knuckles 4 which have loosely mounted therein the rods 5 and carried on said rods 5, between the knuckles 4, are a pair of signaling members 6 and 7. These signaling members are designed in the form of a hand with a pointing finger, but may be of any design whatsoever and are adapted to normally contact with the side faces of the lamp, said signaling members being provided with signaling glasses 8 which are adapted to cover the side signals 3 of the lamp in the normal position of said members 6 and 7 and are adapted to transmit therethrough the light from the lamp when said signals are disposed to their extended positions.

As stated, the signaling devices are adapted to be normally disposed against the sides of the lamp 3, and I have also provided an operating means therefor, and to this end, the rods 5 have their lower ends bent rearwardly as shown at 9 and then again bent forwardly as shown at 10, the latter bent portions being directed inwardly toward one another and extended to a plane forward of the front face of said lamp. The free ends of the bent portions 10 of said rods 5 have pivotally connected thereto, the forward ends of the arcuate arms 11, the opposite ends of said arms being pivotally connected together at a point 12 and these arms 11, which are disposed slightly below the under face of the bottom of the lamp, partially encircle a depending portion 13 of said lamp, said latter portion being often adapted to form an oil reservoir or the like for the lamp. Pivotally connected to the pivot point 12 of the arms 11 is an operating rod 14 which is adapted to be connected to any desired operating means and also connected with the pivot point 12 are the flexible connections 14ª extending therefrom in opposite directions, as clearly shown in Fig. 3 of the drawings.

In practice, when a device is traveling forwardly, the signals 6 and 7 are, as stated previously, in their normal positions against the sides of the lamp 2. As these signals 6 and 7 are provided with signaling glasses which register with the side signals of the lamp, the same will not interfere with the disclosing of these side signals when the lamp is lighted, and should the vehicle carrying this signaling mechanism be turned in one direction, the proper flexible connection 14ª is operated to dispose the proper signaling member to its extended position, thereby indicating to all vehicles in the rear of this moving vehicle, the direction in which the latter is about to turn.

In operating the signals individually, when the one flexible connection is drawn in the direction in which it extends, the signal on the opposite side face of the lamp is forced outwardly to its extended position, as disclosed in the drawings. This is accomplished in view of the fact that the pivot point 12 is drawn with the particular flexible connection which is pulled or drawn and the one arm 11 adjacent the last mentioned connection merely swings on its point of pivotal connection with the lower end 10 of the arm or rod 5, without affecting the latter whatsoever. The other arm 11, however, when drawn in the direction of the pulling of the last mentioned flexible connection 14ª, will actuate the lower curved end of the other rod or arm 5 and cause the same to be swung in such a position as to dispose the signal 6 thereon in its extended position. In order to return this signal to its closed or retracted position against the side of the lamp box, the other flexible connection 14ª is drawn in the direction in which it extends and the effect thereof, is obvious.

While I have shown this operating mechanism as being a manual one, the same may, if desired, be substituted by an automatic means as this particular form of mechanism is, in itself, an unimportant part of the invention. While the flexible connections 14ª, which extend from opposite sides of the pivot point 12, are operated to dispose the one signal or the other to its extended position, when it is desired to throw both signaling devices to their extended positions, the operating rod 14 is actuated. This latter rod 14 is actuated when it is intended, to bring the vehicle carrying this device to a stop. This will readily indicate to those in the rear of the moving vehicle the intention of the driver of the latter and all other vehicles may be governed accordingly.

In my device, the lamp-box is preferably flared toward the rear face thereof, or in other words, the same is tapered outwardly from the front to the rear face of the same, thereby positioning the side signals in inclined planes. In this manner, the light from these side signals of the lamp will be transmitted through the openings in the pivoted signaling members, when the latter are in their extended positions, so that the device may be equally as effective at night as it is during the day.

While I have particularly described my signaling mechanism as adapted for use in connection with a lamp of an automobile, it will be understood that the same may be used entirely independent of said lamp and will be equally as effective.

It will further be seen that I have provided a device which is simple in construction, inexpensive to manufacture and one which will be very efficient and useful in operation and while I have particularly described the elements best adapted to perform the functions set forth, it is obvious that various changes in form, proportion and in the minor details of construction may be resorted to without departing from the spirit or sacrificing any of the principles of the invention.

Having thus described this invention, what I claim is:—

1. The combination with a support; of a pair of vertical rods journaled thereon and spaced from one another, the lower ends of said rods being disposed below said support and being bent rearwardly and thence forwardly, a pair of arms pivoted together at one of their ends and having the opposite ends thereof pivoted respectively to the lower free ends of said rods, signaling members carried on said rods, and operating means connected to said arms, whereby said signals may be individually and simultaneously extended and retracted.

2. A signaling device comprising a support, a pair of vertical rods journaled thereon and spaced from one another, the lower ends of said rods extending slightly below said support and being bent rearwardly and thence forwardly, the latter bent portions of said rods being disposed inwardly toward one another and terminating in a plane forward of the plane of the support, signaling members carried on said rods, a pair of arcuate arms pivoted to one another at their rear ends and having their forward ends respectively pivoted to the free ends of the bent portions of said rods, and an operating rod engaged with said arms at their point of engagement with one another.

In testimony whereof I hereunto affix my signature in the presence of two witnesses.

JOHN H. SIMPSON.

Witnesses:
 HERBERT WRIGHT,
 OSCAR L. WRIGHT.